United States Patent [19]

Godbersen

[11] Patent Number: 5,060,963
[45] Date of Patent: Oct. 29, 1991

[54] HULL CONFORMING BUNK UNIT FOR BOAT TRAILER

[76] Inventor: Byron L. Godbersen, Lake LaJune Estates, Ida Grove, Iowa 51445

[21] Appl. No.: 447,675

[22] Filed: Dec. 8, 1989

[51] Int. Cl.⁵ .............................................. B60P 3/10
[52] U.S. Cl. .................................................. 280/414.1
[58] Field of Search ....................... 280/414.1, 414.2; 414/469, 474, 476

[56] References Cited

U.S. PATENT DOCUMENTS

| | | | |
|---|---|---|---|
| 3,122,245 | 2/1964 | MacKusick et al. | 280/414.1 |
| 3,203,563 | 8/1965 | Blatchford . | |
| 3,993,324 | 11/1976 | Carrick | 280/414.1 |
| 4,278,388 | 7/1981 | Johnson | 280/414.1 |
| 4,448,438 | 5/1984 | DeWalk | 280/414.1 |
| 4,529,217 | 7/1985 | Wood | 280/414.1 |
| 4,592,694 | 6/1986 | Johnson . | |
| 4,820,111 | 4/1989 | Godbersen | 280/414.1 |

Primary Examiner—David M. Mitchell
Assistant Examiner—Martin W. Gerich
Attorney, Agent, or Firm—Henderson & Sturm

[57] ABSTRACT

A boat trailer having elongated bunk units supported fore and aft on the trailer by respective bracket units which are longitudinally and transversely adjustable with the fore bracket unit vertically adjustable, and further with both bracket units rockable about a normally horizontal axis longitudinally of the trailer and boat, providing both a full engagement and conformity of the bunks with the hull of the boat and an automatic nesting engagement with the boat hull, accommodating the bunk units to the great variety of hull configurations.

1 Claim, 3 Drawing Sheets

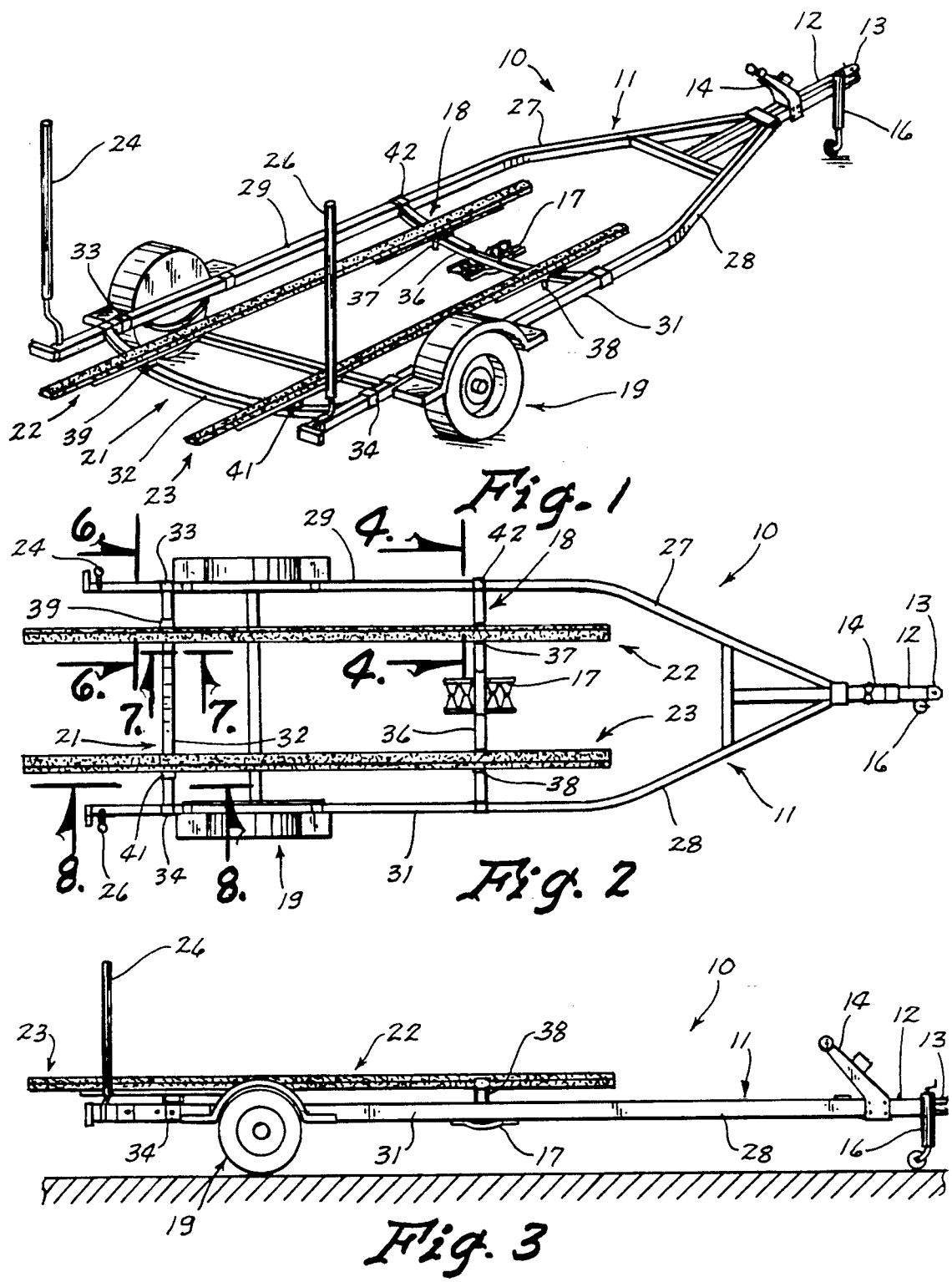

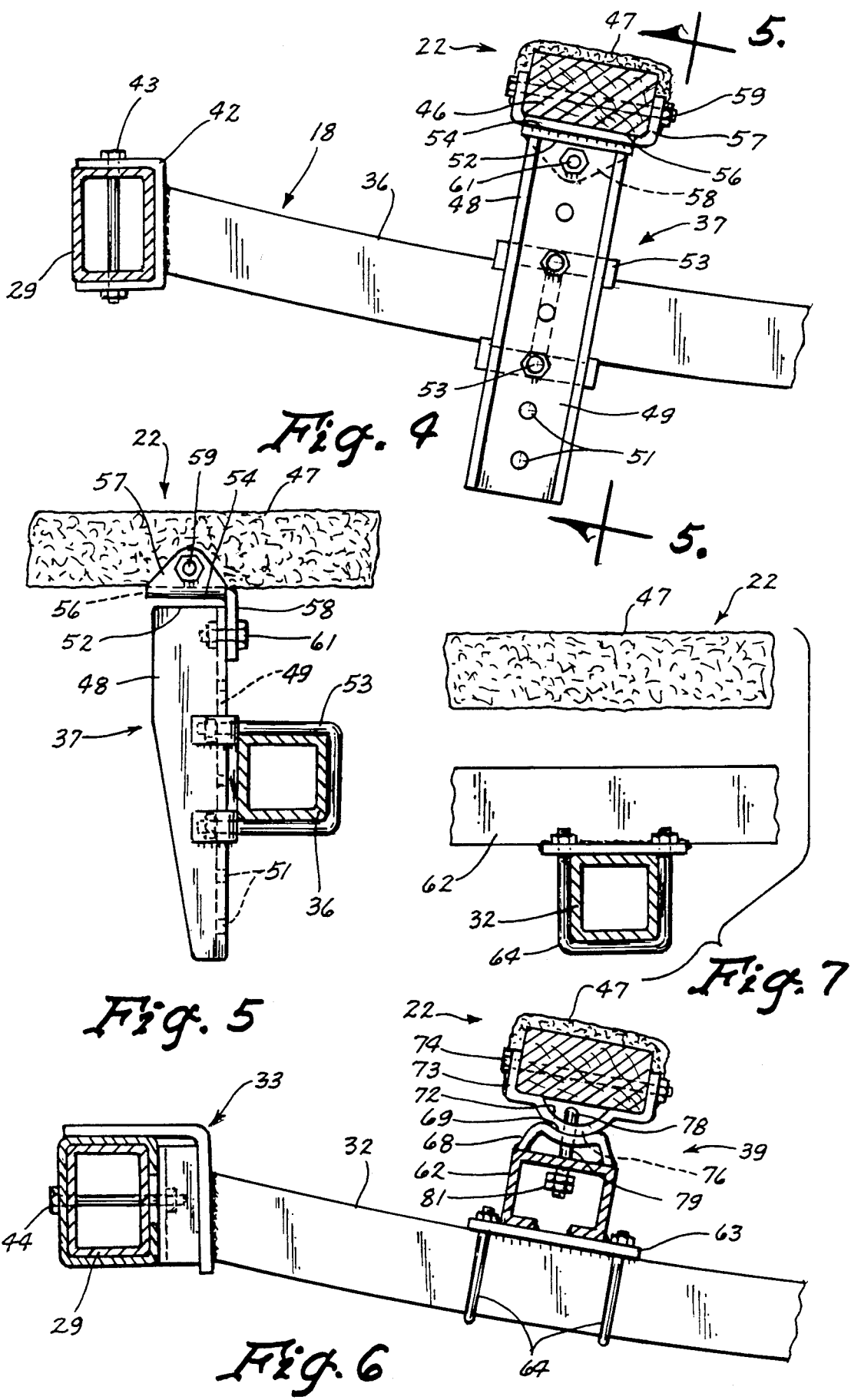

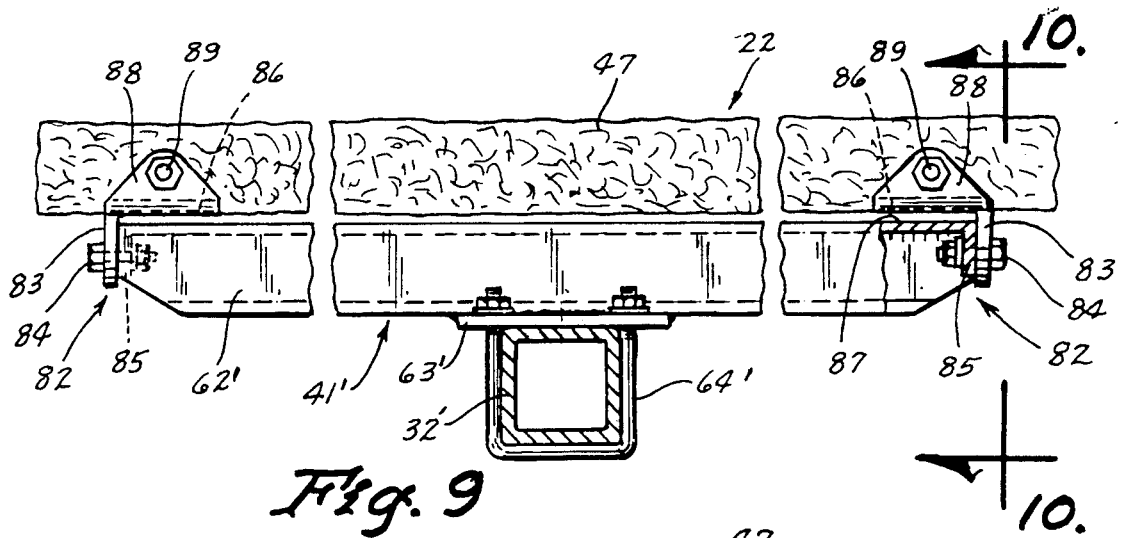
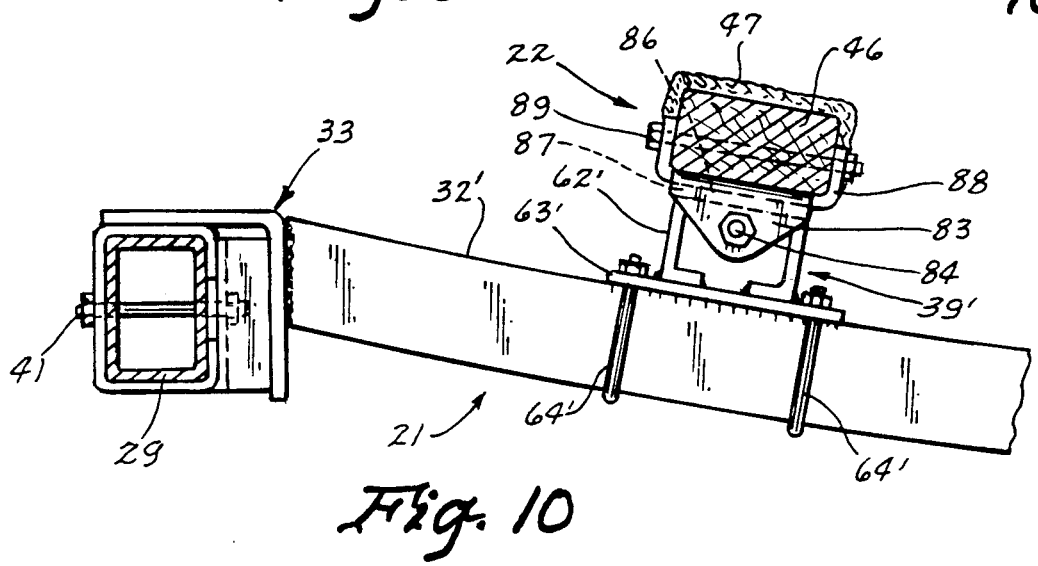

HULL CONFORMING BUNK UNIT FOR BOAT TRAILER

TECHNICAL FIELD

The present invention relates to boat trailers in general, and in particular to bunk-type trailers for transporting a variety of boats of the pleasure boat type.

BACKGROUND ART

With an ever increasing number of different sized, shaped and weighted boats due to the increasing popularity of this industry, it is recognized that the trailer must securely support the boat carried thereby, and that the boat hull supporting elements quickly conform to the contour of the hull for proper distribution of the weight of the boat and to avoid localized stresses.

Adequate weight distribution for the massive hulls supported by these modern tandem-type boat trailers provides relative ease of maneuverability during loading and launching, and steady towing characteristics. A number of different styles of bunk and roller-type boat trailers attempt to provide such weight distribution by having a plurality of longitudinally and laterally spaced areas of weight support; one under the keel at the front, another above the wheel axle, and another at the rear of the keel. Although a definite improvement over past trailers, a full line conformity of the support for maximum hull support is not completely attained in certain instances of hull configurations.

DISCLOSURE OF THE INVENTION

A boat trailer is provided which supports the boat firmly along each side of the hull from front to rear in a parallel-type, flexible, bowed configuration to allow the bunks to conform to the hull contour for equal weight distribution.

The trailer improvement includes a front crossbar which is adjustably mounted near the front of the trailer for movement forwardly and rearwardly of the trailer side frame members; a rear crossbar which also is adjustably mounted near the rear of the trailer frame members for fore and aft movement thereon; a pair of elongated, parallel, transversely spaced bunk units for engaging the boat hull; a first set of identical bunk support units mounted in transversely spaced relation on the front crossbar, each first support unit mounted for vertical and lateral or transverse adjustment on the front crossbar, each first support unit also pivotally supporting a bunk unit for rockable movement about an axis parallel to the longitudinal axis of the trailer; and a second set of identical bunk support units mounted in transversely spaced relation on the rear crossbar, each second support unit mounted for lateral or transverse adjustment on the rear crossbar, each second support unit also pivotally supporting a bunk unit for rockable movement about an axis parallel to the longitudinal axis of the trailer.

It is an object of this invention to provide an improved boat trailer.

It is another object of this invention to provide fore and aft adjustably mounted support devices for the laterally spaced, longitudinally extended bunk units such that the bunk units tend to engage with and conform to the contour of the hull their entire length.

With the front bunk support units vertically adjustable, and with both front and rear bunk support units pivotal about a substantially horizontal axis running parallel the trailer longitudinal axis, the arrangement tends to conform the flexible bunk unit to the boat hull in a nesting manner for maximum hull support, ensuring equal weight distribution.

Further, where conventional bunks are rigidly fixed at two or three places on solid cross members or crossbars, the instant invention provides in one example for the fixing of each bunk at a front cross member only; the rear section of each bunk being mounted at two longitudinally spaced points on a bracket member which is attached to a pivotal rear cross member or crossbar. The rear section therefore acts independently in supporting the heaviest portion of the boat, a distinct advantage in that the bunks are free to naturally support the boat and absorb shock that would normally transfer directly to the hull.

BRIEF DESCRIPTION OF THE DRAWINGS

These and other attributes of the invention will become more clear upon a thorough study of the following description of a preferred embodiment of the invention, particularly when reviewed in conjunction with the accompanying drawings, wherein:

FIG. 1 is a perspective view of a boat trailer of the present invention;

FIG. 2 is a plan view of the boat trailer of FIG. 1;

FIG. 3 is a side elevational view of the boat trailer of FIG. 1 as taken from the right side thereof;

FIG. 4 is an enlarged fragmentary, sectional view taken along the line 4—4 in FIG. 2;

FIG. 5 is a view taken along the line 5—5 in FIG. 4;

FIG. 6 is a fragmentary, sectional view taken along the line 6—6 in FIG. 2;

FIG. 7 is a sectional view taken along the line 7—7 in FIG. 6;

FIG. 8 is a view taken along the line 8—8 in FIG. 2;

FIG. 9 is a sectional view similar to the view of FIG. 8, showing a modification of the structure of FIGS. 6-8; and FIG. 10 is a sectional view taken along the line 10—10 in FIG. 9.

BEST MODE FOR CARRYING OUT THE INVENTION

Although not intended to be so limited, for convenience of illustration the improved boat trailer bunk mounting system of this invention is shown in connection with a trailer for loading and supporting a low or shallow draft-type boat. The illustrated trailer construction enables the boat to be loaded directly from the water by backing the trailer down a ramp or incline and bringing the rearmost hull engaging bunk assemblies of the trailer into position close to the floating boat. The boat is then advanced into contact with the bunk assemblies and drawn forward into supporting engagement therewith and with the forward keel supporting structure for full engagement and support of the boat for purposes of transportation.

Referring now to the drawings, particularly FIG. 1, the boat trailer of this invention is illustrated generally at (10) and comprises a frame assembly (11) including a tongue (12) and hitch (13) for conventional attachment to a prime mover (not shown); a winch assembly (14) for detachable connection to a boat (not shown) to be transported thereby; a stand assembly (16) for supporting the frame assembly (11) in a horizontal condition; a front keel supporting assembly (17) pivotally mounted on a front crossbar assembly (18); a wheel and axle (19) for supporting the frame assembly (11) adjacent the rear end thereof; a rear crossbar assembly (21) pivotally connected to the frame assembly (11); a pair of bunk units (22) and (23) each secured in transversely spaced, parallel relation to the front and rear crossbar assemblies (18) and (21); and a pair of guide members (24), (26) for guiding the boat to be transported by the trailer (10) onto and off of the trailer (10).

Let it be noted that the frame assembly (11) has an A-shape with converged portions of the frame assembly (11) forming the tongue (12), and with outwardly diverging frame members (27) and (28) including the fore part of the frame assembly (11), with parallel and rearwardly extending frame members (29) and (31), completing the frame assembly (11), the rear frame members (29) and (31) extended parallel each other and to the longitudinal axis of the frame assembly (11). The rear crossbar assembly (21) comprises a slightly V-shaped crossbar (32) which has a pair of brackets (33), (34) connected at each outer end thereof for pivotal mounting to the respective rear frame members (29), (31).

The improvement comprises a front crossbar (36) of the assembly (18), which crossbar (36) is secured to and extended transversely between the frame members (29), (31) forwardly of the wheel and axle unit (19); the rear crossbar (32) secured to and extended transversely between the frame members (29), (31) rearwardly of the wheel and axle unit (19); the bunk units (22), (23) which are disposed parallel the longitudinal axis of the trailer (10); a first set of identical bunk support units (37), (38) mounted in transversely spaced relation on the front crossbar (36), each bunk unit (37), (38) adjustable vertically and laterally on the front crossbar (36), and pivotally supporting one of the bunk units (22), (23) for rockable movement about an axis parallel the trailer (10) longitudinal axis; a second set of identical bunk support units (39), (41) mounted in transversely spaced relation on the rear crossbar (32), each second bunk unit (39), (41) adjustable laterally on the rear crossbar (32) and pivotally supporting one of the bunk units (22), (23) for rockable movement about an axis longitudinally aligned with the pivotal axis of one of the first bunk units and also with the trailer longitudinal axis.

Referring to the drawings, the front crossbar assembly (18) comprises the front crossbar (36) the outer ends of which are welded to C-shaped brackets (42) (FIG. 4) adjustably engaged with the respective side frame member (29) and (31), bolt units (43) inserted through alignable openings (not shown) formed in each bracket (42) and formed in longitudinally spaced relation along each frame member (29), (31) for longitudinal adjustability of the front crossbar assembly (18) relative to the trailer (10).

The rear crossbar assembly (21) as mentioned hereinbefore includes a pair of brackets (33), (34) at the outer ends of the crossbar (32) (FIG. 6), and again by the provision of a bolt unit (44) and appropriate alignable openings (not shown) formed in the brackets (33), (34) and the rear portions of the frame members (29), (31), the rear crossbar assembly is also longitudinally movable from one fastened position to another on the frame members (29), (31).

Each bunk unit (22), (23) is identical, comprising an elongated, flexible member (46) (FIG. 4) of wood or like material, covered by a durable padded element (47) for hull protection.

As the first bunk support units (37), (38) are identical, only one (37) will be described. This unit (37) comprises an elongated U-shaped element (48) having a base portion (49) with longitudinally spaced openings (51) formed therein, and with the base portion (49) having a top end (52) with a flat surface. By the provision of a pair of fastening units (53) adapted to engage spaced ones of the openings (51), the element (48) is vertically, adjustably mounted on the front crossbar (36), as well as being transversely adjustable thereon to accommodate the various sized and contoured boat hulls.

Each first bunk unit support (37) also comprises an L-shaped second element (54) (FIG. 4) having a flat base (56) with upstanding legs (57) at each end, and with a depending portion (58) at one side of the base (56). As seen in FIGS. 4 and 5, the legs (57) embrace and are secured to a bunk unit (22) by a fastener (59), and the portion (58) is pivotally connected by another fastener (61) along a normally horizontal axis parallel the longitudinal axis of the trailer (10), and with the bottom surface of the base (56) spaced above the upper surface of the first element top end (52). By this arrangement, the upper element (54) and the attached bunk unit (22) can rock about an axis parallel the trailer longitudinal axis.

As the second bunk support units (39), (41) are also identical, only one will be described, the bunk unit (39), for example, being best illustrated in FIGS. 6 through 8 inclusive. The bunk unit (39) comprises an elongated, tubular member (62), square shaped in cross section, and connected to a plate (63) which in turn is secured to the crossbar (32) by a plurality of inverted U-clamps (64) as best seen in FIG. 6. The location of the plate (63) on the crossbar (32) is laterally adjustable thereon.

At each fore and aft end (66), (67) of the member (62) (FIG. 8), a seat element (68) (FIG. 6) is secured as by welding to the top of the member (62), each seat element (68) having a rounded M-shape in cross section with a central concave portion (69) formed therein. Adapted to be mounted above the seat element (68) for a nested, rockable or pivotal engagement therewith is an elongated bunk supporting element (71) (FIG. 8) having a central convex portion (72) (FIG. 6) adapted to nest with the concave portion (69) of the seat element (68), including further outwardly and upwardly extended portions (73) adapted to be secured, as by fasteners (74) to the bunk unit (22). A pair of longitudinally spaced, transversely extended slots (76) (FIG. 7) are formed in the concave portion (69) for vertical alignment with openings (not shown) in the seat element (68).

The nested seat and bunk supporting elements (68) and (71), respectively, are loosely connected whereby the bunk supporting element (71) is rockable or pivotal relative to the fixed lower seat element (68), by an elongated U-bolt (77), the upper leg (78) (FIG. 8) of which rests longitudinally along the upper surface of the concave portion (69) between the slots (76), with the downwardly extended legs (79) extended through the aligned sets of slots (76) and openings (not shown), and with fastening devices (81) securing the threaded lower ends of the legs (79). By this arrangement, and referring to FIG. 6, it is clearly seen that the upper bunk supporting element (71) is movable about a normally horizontal, longitudinal axis disposed parallel the trailer longitudinal axis, and in an arcuate manner so as to tilt either inwardly relative to the longitudinal axis of the trailer (10), or outwardly as the case may be.

With the bunk units (22), (23) each pivotally supported by the respective first bunk support units (37), (38) on the front crossbar (36), and by the second bunk support units (39), (41) on the second rear crossbar (32), upon engagement by the hull of a boat being moved onto the frame assembly (11), the bunk units (22), (23) pivotally accommodate the particular shape of that hull being engaged thereby, and with the bunk units (22), (23) flexing sufficiently so as to tend to engage and conform completely with the hull of the boat for improved weight distribution.

A modified version of the bunk support of FIGS. 6-8 is shown in FIGS. 9 and 10 wherein second bunk support unit (39') is shown, support unit (41') not being shown. With the units being identical, only the unit (39') will be described. It comprises an elongated tubular member (62'), square shaped in cross section and connected as by welding to a plate (63') secured in turn to the crossbar (32') by U-clamps (64') for lateral adjustment thereon.

At each end of the member (62'), an L-shaped element (82) is provided, one depending leg (83) pivotally secured by a fastener (84) to an end (85) of the element (82), and another leg (86) secured to the base of the bunk member (46) in a spaced relation to the upper surface (87) of the member (62'), as by upturned projections (88) secured to the sides of the bunk unit (22) by fasteners (89). Again, the modified bunk support units (39'), (41') rock about an axis parallel the trailer longitudinal axis and in line with the front bunk support units (37), (38).

I claim:

1. A bunk assembly for supporting a boat on a trailer wherein the trailer includes a pair of laterally spaced frame members supported by a wheel and axle unit, the improvement comprising:
   a front crossbar secured to and extended transversely between the frame members fore of the wheel and axle unit;
   a rear crossbar pivotally secured to and extended between the frame members aft of the wheel and axle unit and swingable about an axis transverse the longitudinal axis of the trailer;
   at least a pair of elongated bunk units, each bunk unit extended parallel the other bunk unit and spaced transversely therefrom, with both said bunk units disposed parallel the longitudinal axis of the trailer;
   means secured to said front crossbar and to a front portion of each bunk unit for mounting each said bunk unit front portion onto said front crossbar; and
   means secured to said rear crossbar comprising a bracket member extended longitudinally of the trailer fore and aft of said rear crossbar and having opposed ends, and comprising further a pair of elements, each element secured to and adjacent an end of said bracket member and secured also respectively to a rear portion of each said bunk unit, whereby each bunk unit is mounted at one point forwardly thereof to said front crossbar, and at two longitudinally spaced points rearwardly thereof to said rear, pivotal crossbar, whereby each bunk unit is free to tend to flex in a vertical plane between said supporting points.

* * * * *